United States Patent
Kim et al.

(10) Patent No.: US 9,067,494 B2
(45) Date of Patent: Jun. 30, 2015

(54) PEDAL FORCE ADJUSTING APPARATUS FOR ACCELERATOR PEDAL

(75) Inventors: Eun Sik Kim, Daegu (KR); Jeong Seon Min, Hwaseong-si (KR); Yong Lee, Hwaseong-si (KR); Yang Rae Cho, Hwaseong-si (KR); Sun Geun Kim, Gyeongsan-si (KR)

(73) Assignees: HYUNDAI MOTOR COMPANY, Seoul (KR); KIA MOTORS CORP., Seoul (KR); SL CORPORATION, Daegu (KR)

( * ) Notice: Subject to any disclaimer, the term of this patent is extended or adjusted under 35 U.S.C. 154(b) by 312 days.

(21) Appl. No.: 13/494,664

(22) Filed: Jun. 12, 2012

(65) Prior Publication Data
US 2013/0125682 A1   May 23, 2013

(30) Foreign Application Priority Data
Nov. 23, 2011 (KR) .................. 10-2011-0122896

(51) Int. Cl.
G05G 1/30 (2008.04)
B60K 20/00 (2006.01)
B60K 26/02 (2006.01)
G05G 5/03 (2008.04)

(52) U.S. Cl.
CPC .......... *B60K 26/021* (2013.01); *Y10T 74/18576* (2015.01); *G05G 1/30* (2013.01); *G05G 5/03* (2013.01)

(58) Field of Classification Search
CPC .......... G05G 1/30; G05G 1/44; G05G 1/445; G05G 1/46; G05G 1/48; G05G 1/483; G05G 1/36; G05G 1/38
USPC ............ 74/512–514, 560, 473.16; 200/61.89, 200/86.5, 61.29; 267/174, 178, 179; 188/72.2, 72.7
See application file for complete search history.

(56) References Cited

U.S. PATENT DOCUMENTS 4,688,437 A * 8/1987 Becker et al. ................ 73/866.5
2012/0297920 A1* 11/2012 Saito et al. .................... 74/513

FOREIGN PATENT DOCUMENTS

| KR | 10-2005-0031261 A | 4/2005 |
| KR | 10-0724700 B1 | 6/2007 |
| KR | 10-0851321 B1 | 8/2008 |
| KR | 10-0851322 B1 | 8/2008 |

* cited by examiner

*Primary Examiner* — Richard W Ridley
*Assistant Examiner* — Yamilka Pinero Medina
(74) *Attorney, Agent, or Firm* — Morgan, Lewis & Bockius LLP (57) ABSTRACT

A pedal force adjusting apparatus for an accelerator pedal regulates a resilient force of a resilient member through movement of an upper carrier and a lower carrier due to rotation of a lead screw. Accordingly, a pedal force of a pedal arm can be easily regulated if necessary.

7 Claims, 8 Drawing Sheets

PEDAL FORCE ADJUSTING APPARATUS FOR ACCELERATOR PEDAL

CROSS-REFERENCE TO RELATED APPLICATION

The present application claims priority of Korean Patent Application Number 10-2011-0122896 filed Nov. 23, 2011, the entire contents of which application is incorporated herein for all purposes by this reference.

BACKGROUND OF INVENTION

1. Field of Invention

The present invention relates to a pedal force adjusting apparatus for an accelerator pedal. More particularly, it relates to an apparatus for adjusting a pedal force of an accelerator pedal which can adjust the pedal force of the accelerator pedal through a simple operation of a user.

2. Description of Related Art

Figure 1:
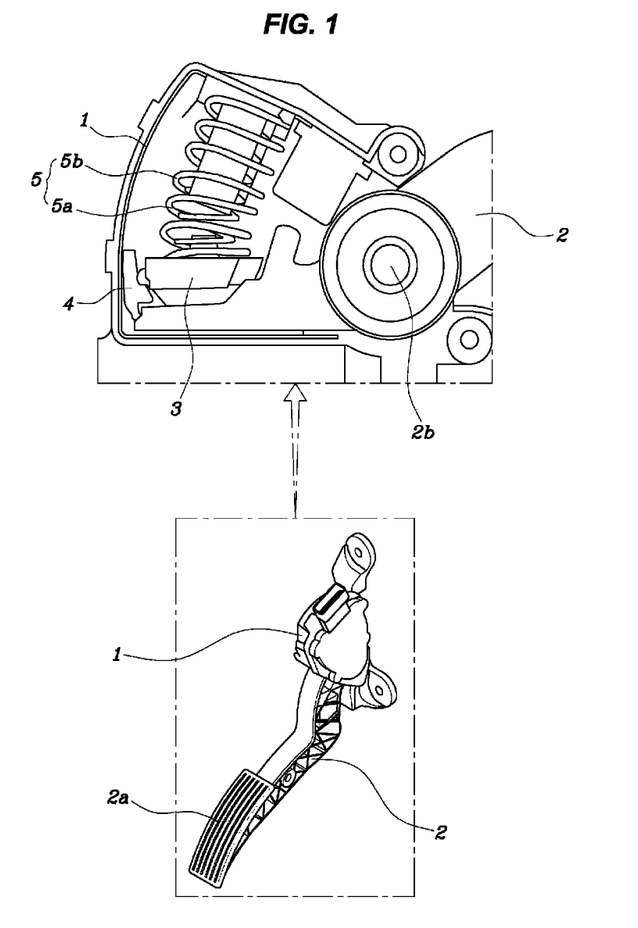
FIG. 1 is a view illustrating a conventional accelerator pedal apparatus.
Figure 2:
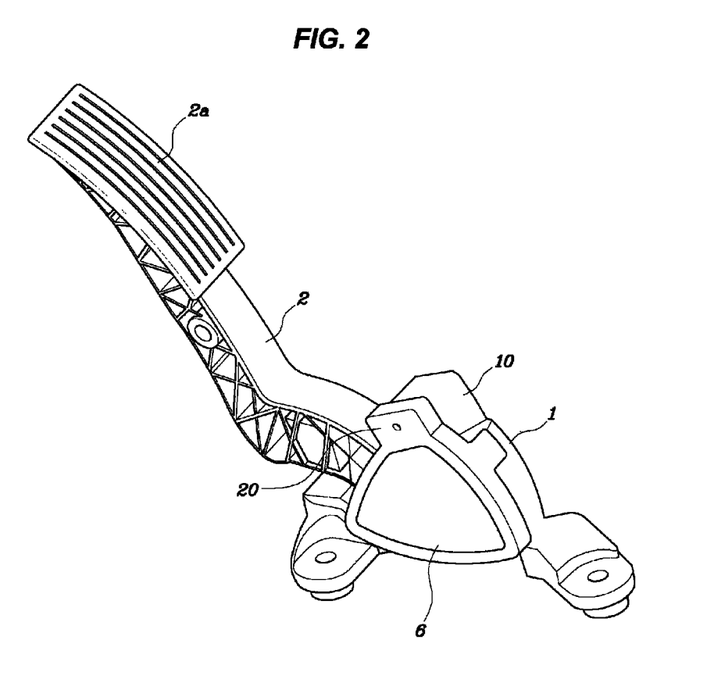
FIG. 2 is a view of an exemplary accelerator pedal including an pedal force adjusting apparatus according to the present invention.
Figure 3:
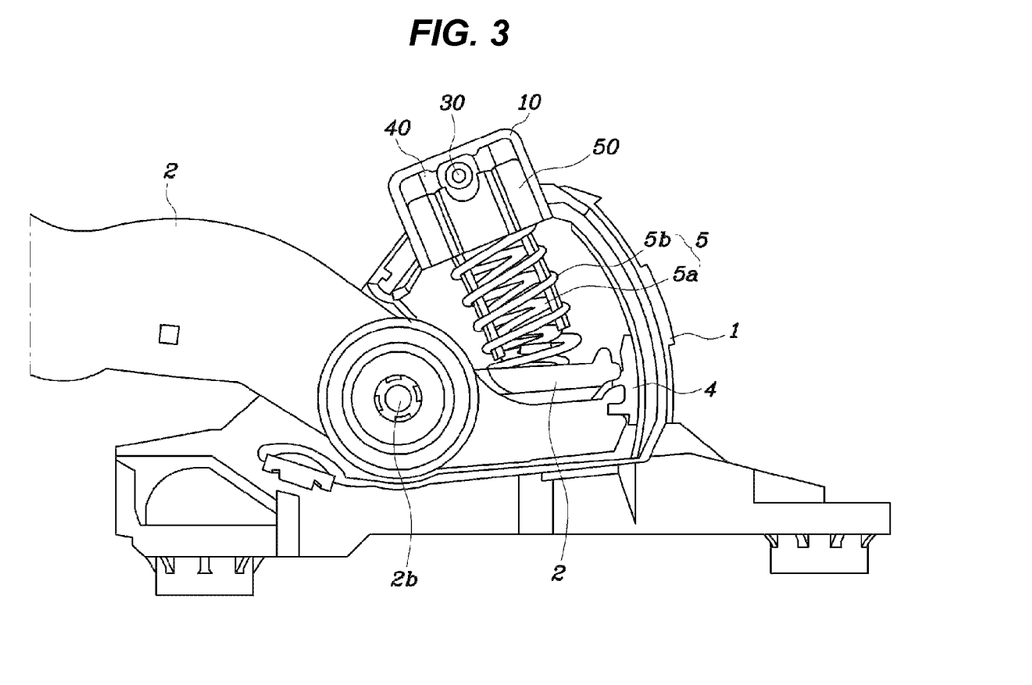
FIG. 3 is a view illustrating a state where a pedal arm housing is separated in FIG. 2.
Figure 4:
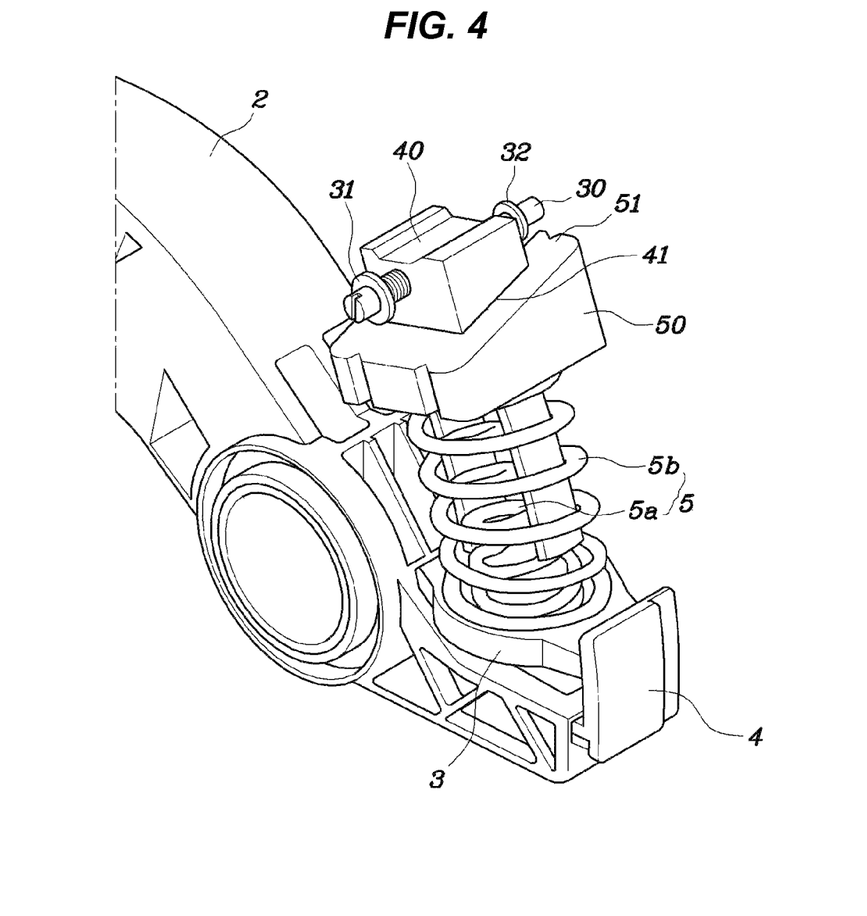
FIG. 4 is a view illustrating a state where a pedal arm housing is removed in FIG. 3.

As illustrated in FIG. 1, a conventional accelerator pedal apparatus includes a pedal arm housing fixedly installed in a dash panel under a driver's seat, a pedal arm 2 having one end at which a pedal 2a is installed and an opposite end inserted into the pedal housing and installed within the pedal arm housing 1 to be rotated with respect to the pedal arm housing 1, a spring plate 3 which is coupled to an end of the pedal arm 2 located within the pedal arm housing 1, a friction shoe 4 coupled to an end of the pedal arm 2 located within the pedal arm housing 1 to frictionally interferes with the inner wall surface of the pedal arm housing 1 drum when the pedal arm 2 is rotated, and a resilient member 5 having one end supported by the spring plate 3 and an opposite end supported by an inner surface of the pedal arm housing 1 facing the spring plate 3. The resilient member 5 includes an inner spring 5a and an outer spring 5b.

In the above-mentioned accelerator pedal apparatus, the pedal force is a force obtained by adding a reaction force of the friction shoe 4 which frictionally interferes with an inner wall surface of the pedal arm housing 1 when the pedal arm 2 is rotated about a hinge shaft 2b and a reaction force generated when the inner spring 5a and the outer spring 5b are resiliently compressed.

As a force applied to the pedal arm 2 by a driver becomes larger if a pedal force is large, the fatigue of the driver manipulating the accelerator pedal also increases. On the other hand, when a pedal force is small, a driver cannot sufficiently feel an accelerator pedal manipulating feeling. Consequently, the automotive manufacturers fabricate a accelerator pedal according to the pedal force characteristics of an accelerator pedal which are suitable for safety rules of each nation.

However, in the conventional accelerator pedal apparatus, in order to adjust the pedal effort, the friction shoe 4 and the resilient member 5 should all be changed to new ones. Therefore, the accelerator pedal apparatus cannot be used for common use.

An exemplar of an accelerator pedal is described in detail in Korean Patent No. 10-0724700.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a pedal force adjusting apparatus for an accelerator pedal which can properly adjust a pedal force of the accelerator pedal with a simple operation if necessary without exchanging a part, faithfully satisfy safety rules for pedal force, and allows common use of the accelerator pedal.

Various aspects of the present invention provide for a pedal force adjusting apparatus including a lead screw opposite ends of which pass through a carrier housing and a carrier housing cover so as to be rotated about an axis; an upper carrier screw-coupled to the lead screw such that the lead screw passes through the upper carrier and configured to be moved along the lead screw within the carrier housing while the lead screw is rotated; and a lower carrier installed such that an upper surface thereof contacts the upper carrier and a lower surface thereof contacts an end of a resilient member and configured to be moved in a direction in which the resilient member is pushed or released when the upper carrier is moved along the lead screw.

The carrier housing may be integrally formed with a pedal arm housing facing an end of a pedal arm in a rotating direction of the pedal arm, a carrier housing cover may be integrally formed with the pedal arm housing cover, the pedal arm housing and the pedal arm housing cover may be assembled to be separable from each other, and the carrier housing and the carrier housing cover may be assembled to be separable from each other.

A housing stopper flange and a cover stopper flange may be respectively formed at opposite ends of the lead screw to be prevented from being separated from the carrier housing while contacting an inner surface of the carrier housing and an inner surface of the carrier housing when the lead screw is moved along a lengthwise direction thereof.

Inclined surfaces having the same inclination may be formed on lower and upper surfaces of the upper carrier and the lower carrier contacting each other.

A plurality of fixing bosses may be formed on an outer surface of the housing stopper flange facing the carrier housing along a circumferential direction of the lead screw, and a plurality of slits into which the fixing bosses are inserted may be disposed radially about the screw hole on an inner surface of the carrier housing 10 facing the fixing bosses.

A width according to a moving direction of the upper carrier may be formed to be smaller than a width of the lower carrier such that the inclined surface of the upper carrier is moved along the inclined surface of the lower carrier while the lead screw is rotated about an axis.

A tool insert recess may be formed on one surface of the lead screw where the housing stopper flange is located, and the pedal force adjusting apparatus further includes a pedal force adjusting tool inserted into the tool insert recess for axial rotation of the lead screw.

According to various aspects of the present invention, a resilient force of the resilient member can be regulated through movement of the upper carrier and the lower carrier due to rotation of the lead screw without exchanging a part. Accordingly, a pedal force of the pedal arm can be easily regulated if necessary, faithfully satisfying safety rules for pedal force and allowing common use of the accelerator pedal.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As illustrated in FIGS. 2 to 8, the vehicle accelerator pedal apparatus includes a pedal arm housing 1 fixedly installed in a dash panel under a driver's seat, a pedal arm 2 having a pedal 2a at one end thereof and an opposite end of which is inserted into the pedal arm housing 1 so as to be rotatable about a hinge shaft 2b with respect to the pedal housing 1, a spring plate 3 coupled to an end of the pedal arm 2 located within the pedal arm housing 1, a friction shoe 4 coupled to an end of the pedal arm 2 located within the pedal arm housing 1 so as to frictionally interfere with an inner wall surface of the pedal arm housing 1 while the pedal arm 2 is rotated, and a resilient member 5 installed such that one end thereof is supported by the spring plate 3 and an opposite end thereof is supported by an inner surface of the pedal arm housing 1 facing the spring plate 3. The resilient member 5 includes an inner spring 5a and an outer spring 5b.

In the accelerator pedal apparatus constructed as mentioned above, a sum of a reactive force of the friction shoe 4 frictionally interfering with the inner wall surface of the pedal arm housing 1 while the pedal arm 2 is rotated about the hinge shaft 2b and a reactive force generated while the inner spring 5a and the outer spring 5b is resiliently compressed acts as a pedal force.

The present invention has a construction by which characteristics of a pedal force can be varied by a reactive force of the frictional shoe 4 and a simple manipulation of a user even without exchanging the reactive force of the friction member 5.

That is, the pedal force adjusting apparatus for an accelerator pedal according to the present invention includes a lead screw 30 opposite ends of which pass through a carrier housing 10 and a carrier housing cover 20 so as to be rotated about an axis, an upper carrier 40 screw-coupled to the lead screw 30 such that the lead screw 30 passes through the upper carrier 40 and configured to be moved along the lead screw 30 within the carrier housing 10 while the lead screw 30 is rotated, and a lower carrier 50 installed such that an upper surface thereof contacts the upper carrier 40 and a lower surface thereof contacts an end of the resilient member 5 and configured to be moved in a direction in which the resilient member 5 is pushed or released when the upper carrier 40 is moved along the lead screw 30.

Here, the carrier housing 10 is integrally formed with the pedal arm housing 1 facing an end of the pedal arm 2 in a rotating direction of the pedal arm 2, and the carrier housing cover 20 is integrally formed with the pedal arm housing cover 6. One will appreciate that the carrier housing and the pedal arm housing may be monolithically formed. The pedal arm housing 1 and the pedal arm housing cover 6 are assembled to be separable from each other, and the carrier housing 10 and the carrier housing cover 20 are also assembled to be separable from each other.

The upper carrier 40 and the lower carrier are both installed to be located within the carrier housing 10.

A housing stopper flange 31 and a cover stopper flange 32 are respectively formed at opposite ends of the lead screw 30 to be prevented from being separated from the carrier housing 10 while contacting an inner surface of the carrier housing 10 and an inner surface of the carrier housing 20 when the lead screw 30 is moved along a lengthwise direction thereof.

Screw holes 11 and 21 through which the lead screw 30 passes are respectively formed in the carrier housing 10 and the carrier housing cover 20. The diameters of the screw holes 11 and 21 is larger than that of the lead screw 30 and smaller than that of the housing stopper flange 31.

Inclined surfaces 41 and 51 having the same inclination are formed on lower and upper surfaces of the upper carrier 40 and the lower carrier 50 contacting each other.

Figure 5:
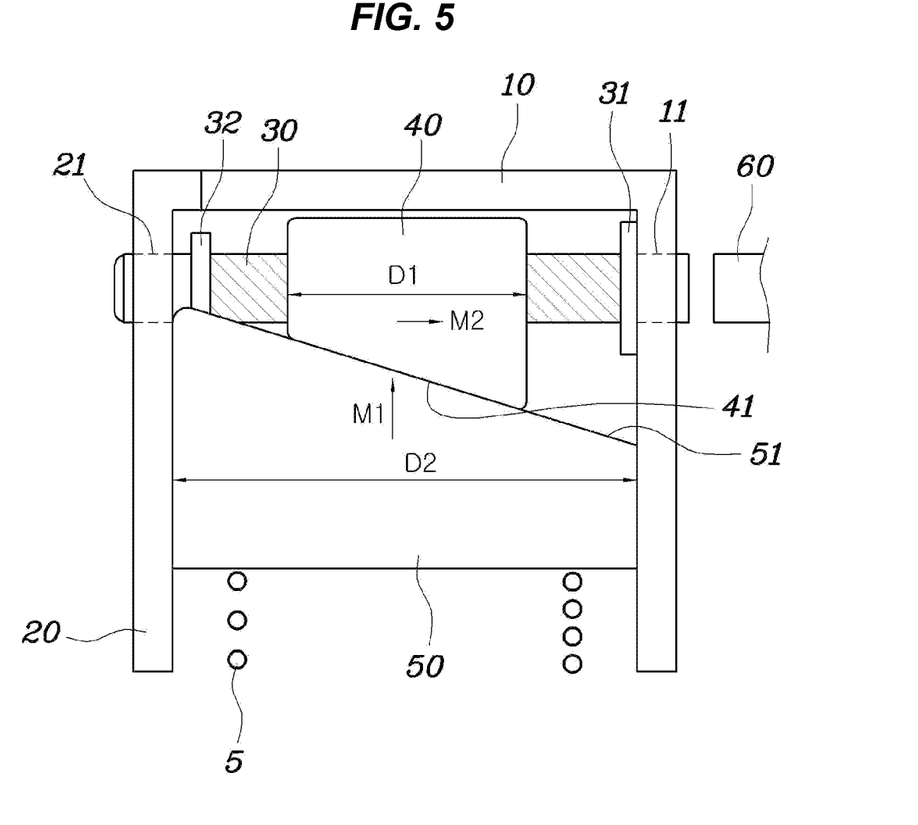
FIGS. 5, 6 and 7 are views illustrating an exemplary construction of the pedal force adjusting apparatus according to the present invention.
Figure 6:
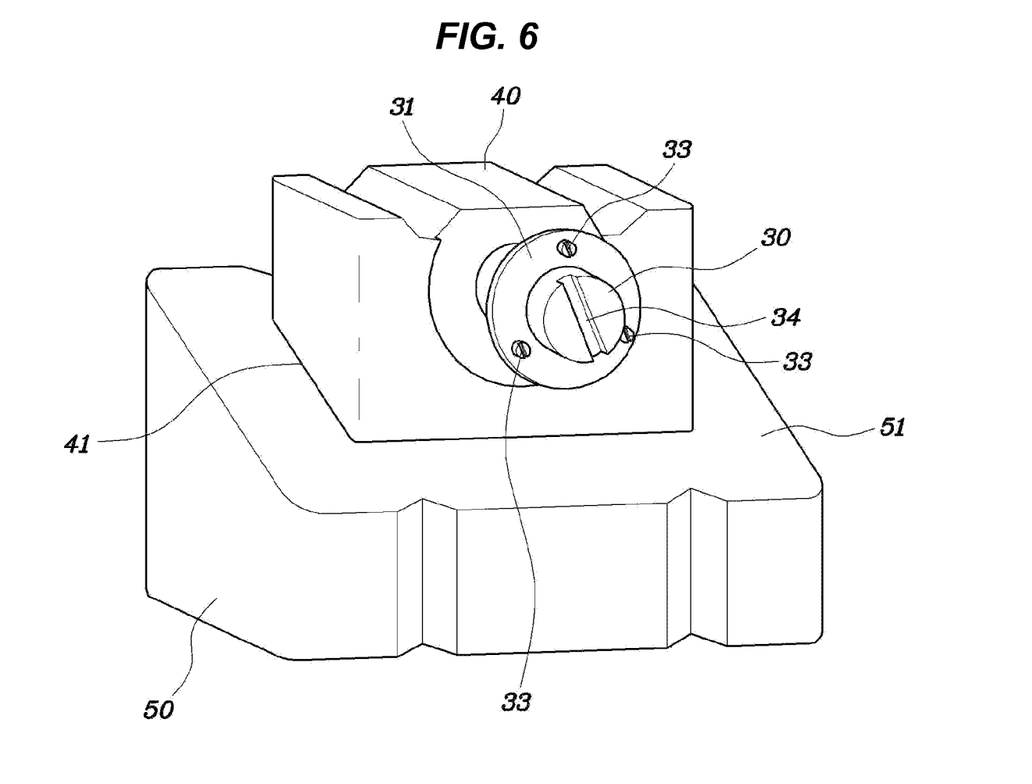
Figure 7:
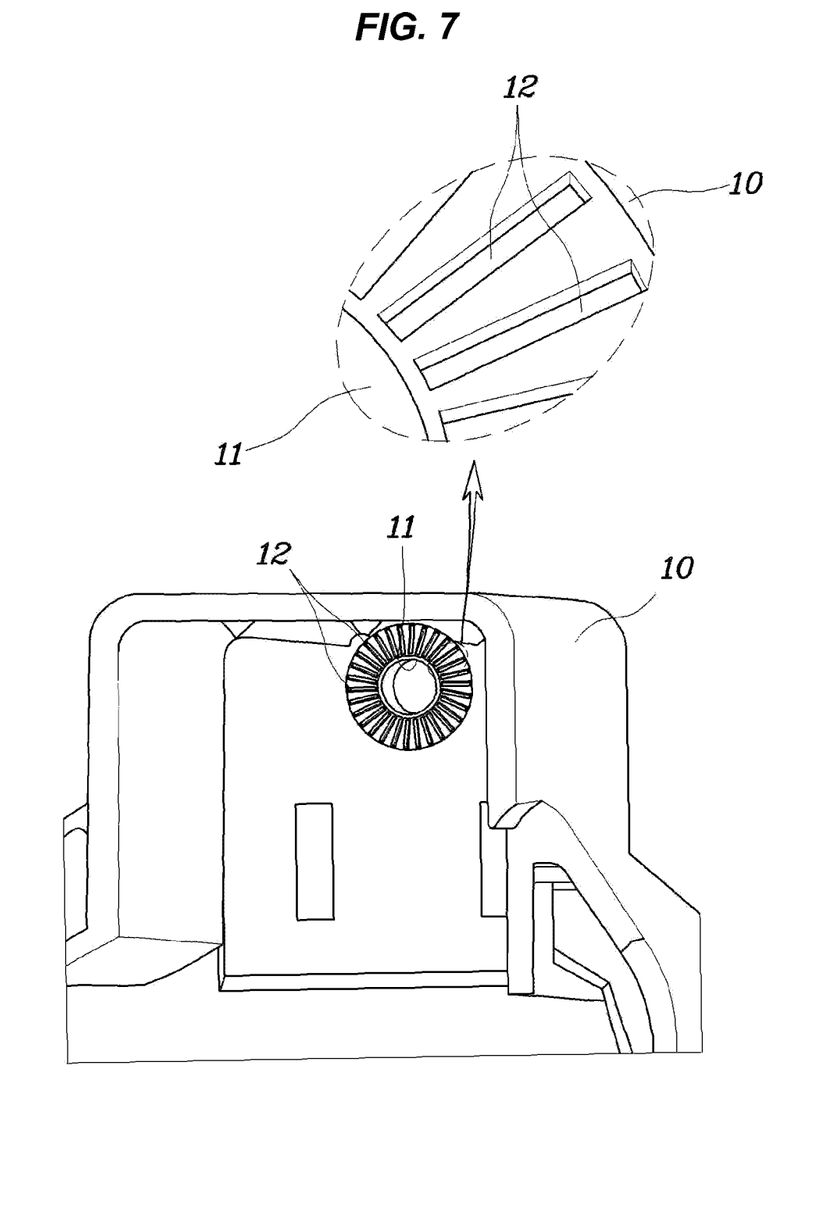

Here, as illustrated in FIG. 5, the inclined surface of the lower carrier 50 is higher at its one end on a side of the carrier housing cover 20 and is lower at an opposite end thereof, but may be formed in an opposite way.

A width D1 according to a moving direction of the upper carrier 40 is formed to be smaller than a width D2 of the lower carrier 50 such that the inclined surface 41 of the upper carrier 40 is moved along the inclined surface 51 of the lower carrier 50 while the lead screw 30 is rotated about an axis.

A plurality of fixing bosses 33 are formed on an outer surface of the housing stopper flange 31 facing the carrier housing 10 along a circumferential direction of the lead screw 30, and a plurality of slits 12 into which the fixing bosses 33 are inserted are disposed radially about the screw hole 11 on an inner surface of the carrier housing 10 facing the fixing bosses 31.

In a normal state where the pedal arm 2 is rotated about the hinge shaft 2b, the fixing bosses 31 remain inserted into the slits 12 so that pedal force cannot be regulated, and if the lead screw 30 is moved in a direction toward the carrier housing cover 20, the fixing bosses 31 can be pulled out from the slits 12 so that pedal force can be regulated.

A tool insert recess 34 is formed on one surface of the lead screw 30 where the housing stopper flange 31 is located, and the apparatus according to the present invention further includes a pedal force adjusting tool 60 inserted into the tool insert recess 34 for axial rotation of the lead screw 30.

Hereinafter, an operation of the apparatus according to the present invention will be described.

As illustrated in FIG. 5, if the housing stopper flange 31 contacts an inner surface of the carrier housing 10 and accordingly the fixing bosses 33 formed in the housing stopper flange 31 are inserted into the slits 12 formed on an inner surface of the carrier housing 10, the lead screw 30 cannot be rotated by support forces of the fixing bosses 33 inserted into the slits 12 and the upper carrier 40 cannot be moved along a lengthwise direction of the lead screw 30, whereby pedal force cannot be regulated.

When it is impossible to regulate pedal force, the lower carrier 50 receives a force toward the upper carrier 40 in the state of FIG. 5 (in a direction of arrow M1) by a force of the resilient member 5 and the upper carrier 40 and the lead screw 30 receive a rightward force toward the housing stopper flange 31 (in a direction of M2). Accordingly, the fixing bosses 33 formed in the housing stopper flange 31 remains inserted into the slits 12 formed in the carrier housing 10.

Figure 8:
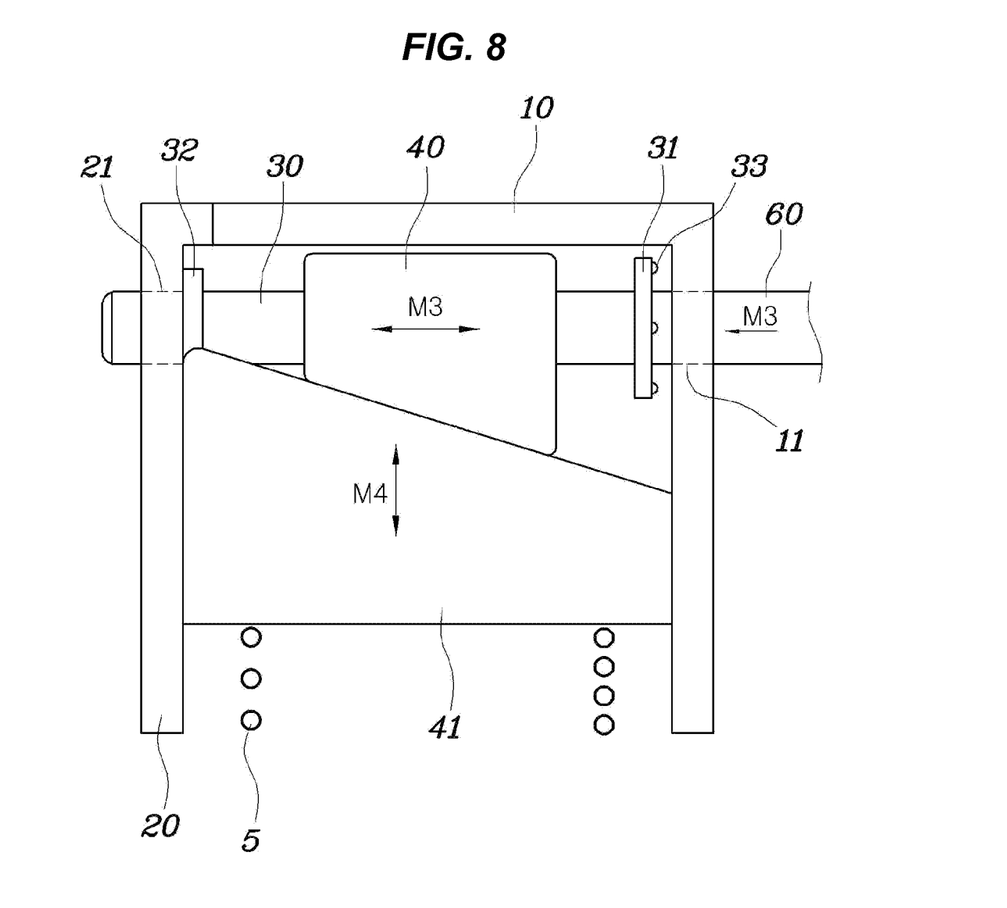
FIG. 8 is a view illustrating an exemplary process of adjusting a pedal force of the apparatus according to the present invention.

If the lead screw 30 is pushed toward the carrier housing cover 20 as in FIG. 8 by an operator inserting a tip of the pedal force adjusting tool 60 into the tool insert recess 34 of the lead screw 30 and applying a predetermined force at the same time to adjust pedal force, the lead screw 30 and the upper carrier 40 is moved leftward toward the carrier housing cover 20 and the fixing bosses 33 of the housing stopper flange 31 inserted into the slits 12 is pulled out and separated from the slits 12. Then, as the lead screw 30 can be rotated freely, pedal force can be regulated.

In this state, if the pedal force adjusting tool 60 is rotated clockwise or counterclockwise, the lead screw 30 is rotated in the same direction and the upper carrier 40 screw-coupled to the lead screw 30 is moved along the lead screw 30 as indicated by arrow M3 in FIG. 8. Then, the lower carrier 50 contacting the upper carrier 40 by means of the inclined surfaces 41 and 51 is moved upward and downward as indicated by arrow M4 of FIG. 8.

Here, if the upper carrier 40 is moved leftward along the lead screw 30 in the state of FIG. 8, the lower carrier 50 is moved downward and the resilient member 5 is compressed and deformed to increase resilient force. Accordingly, a pedal force of the pedal arm 2 gradually increases.

On the other hand, if the upper carrier 40 is moved rightward along the lead screw 30 in the state of FIG. 8, the lower carrier 50 is moved upward and the resilient force of the resilient member 5 is restored to decrease resilient force. Accordingly, the pedal force of the pedal arm 2 gradually decreases.

If a pedal force of the pedal arm 2 is completely regulated through movement of the lower carrier 50 and the pedal force adjusting tool 60 is pulled out from the tool insert 34, the fixing bosses 33 formed in the housing stopper flange 31 are inserted into the slits 12 formed in the carrier housing 10 again through movement of the lower carrier 50 in the direction M1 due to the resilient member 5 and movement of the upper carrier 40 and the lead screw 30 in the direction M1, as described with reference to FIG. 5.

In the pedal force adjusting apparatus according to the present invention, a resilient force of the resilient member 5 can be regulated through movement of the upper carrier 40 and the lower carrier 50 due to the rotation of the lead screw 30 without exchanging the friction shoe 4 and the resilient member 5, and thus a pedal force of the pedal arm 2 can be regulated.

Accordingly, the apparatus according to the present invention can easily adjust a pedal force of the pedal arm 2 with a simple operation if necessary. In particular, the present invention faithfully satisfies safety rules for pedal force and allows a common use of an accelerator pedal.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pedal force adjusting apparatus for an accelerator pedal, comprising:
    a lead screw including opposite ends which pass through a carrier housing and a carrier housing cover so as to rotate about an axis thereof with respect to the carrier housing and the carrier housing cover;
    an upper carrier threadedly coupled to the lead screw such that the lead screw passes through the upper carrier and the upper carrier is moved along the lead screw within the carrier housing by rotation force of the lead screw; and
    a lower carrier installed such that an upper surface thereof contacts the upper carrier and a lower surface thereof contacts an end of a resilient member, the lower carrier being configured to move in a direction in which the resilient member is pushed or released when the upper carrier moves along the lead screw;
    wherein the resilient member is configured to be pushed or released in a direction to be crossed with the axis of the lead screw.

2. The pedal force adjusting apparatus of claim 1, wherein the carrier housing is integrally formed with a pedal arm housing facing an end of a pedal arm in a rotating direction of the pedal arm, the carrier housing cover is integrally formed with a pedal arm housing cover, the pedal arm housing and the pedal arm housing cover are separable from each other, and the carrier housing and the carrier housing cover are separable from each other.

3. The pedal force adjusting apparatus of claim 1, wherein a housing stopper flange and a cover stopper flange are respectively formed at opposite ends of the lead screw to prevent separation from the carrier housing while contacting inner surfaces of the carrier housing when the lead screw is moved along a lengthwise direction thereof.

4. The pedal force adjusting apparatus of claim 3, wherein a plurality of fixing bosses are formed on an outer surface of the housing stopper flange facing the carrier housing along a circumferential direction of the lead screw, and a plurality of slits into which the fixing bosses are inserted are disposed radially about a screw hole formed on an inner surface of the carrier housing facing the fixing bosses.

5. The pedal force adjusting apparatus of claim 4, further including a pedal force adjusting tool inserted into a tool insert recess for axial rotation of the lead screw, wherein the tool insert recess is formed on one surface of the lead screw where the housing stopper flange is located.

6. The pedal force adjusting apparatus of claim 1, wherein inclined surfaces having the same inclination are formed on lower and upper surfaces of the upper carrier and the lower carrier contacting each other.

7. The pedal force adjusting apparatus of claim 6, wherein a width according to a moving direction of the upper carrier is formed to be smaller than a width of the lower carrier such that the inclined surface of the upper carrier is moved along the inclined surface of the lower carrier while the lead screw is rotated about an axis.

* * * * *